US 9,455,866 B2

United States Patent
Ahrensbach et al.

(10) Patent No.: US 9,455,866 B2
(45) Date of Patent: Sep. 27, 2016

(54) AUTO-CONFIGURATION OF NETWORK DEVICES

(75) Inventors: Janus Ahrensbach, Esbjerg (DK);
Ulrich Vestergaard B. Hansen, Herning (DK); Jannik Hoejgaard, Brande (DK); Vivek Kulkarni, Unterhaching (DE); Flemming Bay Thunbo, Galten (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 981 days.

(21) Appl. No.: 13/444,256

(22) Filed: Apr. 11, 2012

(65) Prior Publication Data

US 2012/0269091 A1 Oct. 25, 2012

(30) Foreign Application Priority Data

Apr. 19, 2011 (EP) ................................ 11163015

(51) Int. Cl.
*H04L 12/24* (2006.01)
*F03D 7/04* (2006.01)
*H04L 29/12* (2006.01)

(52) U.S. Cl.
CPC .......... *H04L 41/0809* (2013.01); *F03D 7/047* (2013.01); *F03D 7/048* (2013.01); *H04L 41/0806* (2013.01); *H04L 61/103* (2013.01); *H04L 61/6004* (2013.01); *H04L 61/6068* (2013.01); *H04L 61/2015* (2013.01); *H04L 61/2038* (2013.01); *Y02E 10/723* (2013.01); *Y04S 40/162* (2013.01)

(58) Field of Classification Search
None
See application file for complete search history.

(56) References Cited

U.S. PATENT DOCUMENTS

| 7,020,720 B1 | 3/2006 | Bollay |
| 7,706,371 B1 * | 4/2010 | Wing et al. ................ 370/392 |

(Continued)

FOREIGN PATENT DOCUMENTS

| DE | EP2141359 A1 * | 1/2010 |
| WO | WO 2006075265 A1 | 7/2006 |

OTHER PUBLICATIONS

J Fink et al. :TR-124 Functional Requirements for Broadband Residential Gateway Devices, issue 1.01. Dec. 2006, pp. 1-93, XP002662669; Book; 2006.*

(Continued)

*Primary Examiner* — Hassan Phillips
*Assistant Examiner* — Saba Tsegaye (57) ABSTRACT

A network device which is connectable to a data communication network is provided. The network device includes at least two device components including a first device component. Each device component has a communication interface, which is accessible via an internal static network address, associated for communicating data. The network device further includes a node device having an internal interface for communication with the communication interface of each of the at least two device components and an external interface for communication with an external device different from the network device. The node device is configured for receiving external data from the data communication network and providing to the first device component, in response the external data and by using the internal network address of the first device component, component specific data related to the first device component.

8 Claims, 2 Drawing Sheets

(56) References Cited

U.S. PATENT DOCUMENTS

2003/0101243 A1    5/2003  Bollay
2006/0120305 A1*   6/2006  Van Den Bosch et al. .. 370/254
2007/0255832 A1*  11/2007  Riesberg ............ H04L 61/2015
                                                        709/226
2009/0083374 A1*   3/2009  Saint Clair ................... 709/203
2011/0054825 A1*   3/2011  Perla et al. ................... 702/113
2011/0314137 A1*  12/2011  Vermoesen ................... 709/221

OTHER PUBLICATIONS

M. Patrick: "DHCP Relay Agent Information Option", Motorola BCS, Jan. 2001, Network Working Group, Request for Comments: 3046; Others; 2001.

\* cited by examiner

AUTO-CONFIGURATION OF NETWORK DEVICES

CROSS REFERENCE TO RELATED APPLICATIONS

This application claims priority of European Patent Office application No. 11163015.8 EP filed Apr. 19, 2011. All of the applications are incorporated by reference herein in their entirety.

FIELD OF INVENTION

The present invention relates to the field of network devices which are connectable to a data communication network.

BACKGROUND OF THE INVENTION

A configuration of network devices is known in the art and may include the setting of a network address, for example an interne protocol (IP) network address. The network address of a network device may be static or dynamic. A static network address is configured manually and is statically associated with the network device or the respective network interface thereof. Further, it is known to assign a network address by a dynamic host configuration protocol server (DHCP server), where usually the network device does not receive the same network address upon repeated connection to the DHCP server. In order to assign the same network address to the network device while still using a DHCP server, it is known to configure the DHCP server accordingly based on a unique identifier such as a media access control address (MAC address) of the respective network interface of the network device. For example, the MAC address may be associated with a specific network address in the DHCP server. This is specified in RFC 3046: "The new option is called the Relay Agent Information option and is inserted by the DHCP relay agent when forwarding client-originated DHCP packets to a DHCP server. Servers recognizing the Relay Agent Information option may use the information to implement IP address or other parameter assignment policies. The DHCP Server echoes the option back verbatim to the relay agent in server-to-client replies, and the relay agent strips the option before forwarding the reply to the client."

SUMMARY OF THE INVENTION

However, associating the MAC addresses of a network device with respective network addresses requires a time-consuming manual configuration. This problem is even more severe in cases where a network device comprises two or more components which have a network interface.

In view of the above-described situation, there exists a need for an improved technique that enables to provide a network device which substantially avoids or at least reduces one or more of the above-identified problems.

According to a first aspect, there is provided a network device, being connectable to a data communication network, the network device comprising: at least two device components including a first device component, each device component having a communication interface for communicating data, the communication interface being accessible by using an internal network address associated with the communication interface; a node device having an internal interface for communication with the communication interface of each of the at least two components and an external interface for communication with an external device different from the network device; and the node device being configured for receiving external data from the data communication network; the node device being further configured for providing to the first device component, in response the external data and by using the internal network address of the first device component, component specific data related to the first device component.

This aspect of the herein disclosed subject-matter is based on the idea that by providing the at least two device components of a network device with an internal internet address and further providing a node device which communicates between the external data communication network and the device components of the internal network, the configuration effort workload for configuring the network device can be reduced.

The data communication network may be any suitable network, for example a wireless or wired communication network, a local area network or, in another example, the internet.

According to an embodiment, the network device and/or the at least two device components are configured for using a specific protocol for the communication therebetween. One example of such a protocol is the internet protocol (IP). However, any other protocol may also be used instead.

It should be understood that the first device component which is one of the at least two device components does not have a special meaning among the at least two device components. Rather referring to this device component as the "first" device component only simplifies the referral to one of the at least two device components. Hence, referral to one of the device components as "first device component" shall not be construed as limiting the herein disclosed subject matter.

According to an embodiment, the external data are configuration data for the first device component. Accordingly, the component-specific data are adapted for configuring the first device component. According to an embodiment, the component-specific data is a portion of the external data. For example, in an embodiment the external data may include the component-specific data and a device identifier which identifies the device component which is the target of the component-specific data.

According to a further embodiment, the node device is configured for receiving the configuration data for the first device component and for generating on the basis of this configuration data the component-specific data adapted for configuring the first device component.

According to a further embodiment, the external data are network configuration data and the component-specific data are adapted for configuring network settings of the first device component. For example, in an embodiment the component-specific data are adapted for setting a network address in the first device component. For example, in an embodiment the component-specific data are adapted for associating a global network address with the communication interface of the first device component, wherein the global network address allows addressing of the first device component from the data communication network. In other words, such a global network address provides for a unique identification of the communication interface of the first device component. According to an embodiment, unique identification means that at least within the data communication network the global network address is unique.

Generally herein, the term "global network address" refers to a network address of the data communication network outside the network device. In an embodiment where the data communication network is the internet, the global network address is indeed a "globally valid" network address. However, in other embodiments the data communication network may be a local area network comprising the network device (e.g. a private local area network in the sense of the internet protocol). In such embodiments, the term "global" in "global network address" does of course not refer to a globally valid network address but rather to a private address in the local area network.

According to other embodiments, the component-specific data are adapted for configuring an element of the first device component, the element being different from the communication interface of the first device component.

According to an embodiment, the communication interface of each device component includes at least two logical interfaces of which a first logical interface is associated with the internal network address and the second logical interface is associated with the global network address. This allows maintaining the internal network address and, in an embodiment, allows addressing of each of the at least two device components even after the global network address is set in the communication interface of the at least two device components. According to an embodiment, the communication interface is a physical network interface. According to a further embodiment, the logical interfaces are logical network interfaces. For example, in an embodiment the logical network interfaces are logical interfaces of a virtual local area network (VLAN) in which traffic in at least two logical networks is separated by inclusion of network identifiers which identify the respective logical network to which a traffic portion belongs.

According to a further embodiment, the internal network address of the at least one device component is a fixed network address. This allows a static configuration of the internal network address of each communication interface in the network device. This means that a plurality of network devices can be produced having the same internal network configuration. This facilitates maintenance as well as production, since service workers or automatic services within the network device can address the communication interface of each of the at least two device components after production without requiring a configuration of the network addresses of the device components. Together with a global network address that is associated with each communication interface in accordance with embodiments disclosed herein, the at least two device components of the network device, or the respective communication interfaces thereof, are addressable by the node device as well as by an external network component of the data communication network.

According to a further embodiment, the node device is configured for broadcasting a configuration request to the external network, the configuration request including a device identifier identifying the network device. Such an embodiment allows a configuration device to select configuration data for the network device identified by the device identifier and provide the configuration data to the network device. In particular, this allows for an automatic configuration of the network device. For example, in an embodiment, the network device may be configured to broadcast the configuration request after each powering up of the network device. In response hereto, the network device may receive the configuration data for its at least two device components from a configuration device which has received the configuration request of the network device.

An example of a network device according to the herein disclosed subject-matter is a power generation device, for example a wind turbine device. In particular when establishing a wind farm having a plurality of wind turbine devices, in accordance with embodiments of the herein disclosed subject-matter each wind turbine device may have an initial configuration of its internal network addresses that are identical among the wind turbine devices. Setting individual global network addresses of the individual device components of the wind turbine devices may then be performed in accordance with embodiments of the herein disclosed subject-matter. Such configuration can be done manually, semiautomatic or fully automatic.

According to a second aspect of the herein disclosed subject-matter, a configuration device is provided, the configuration device providing configuration data to device components of at least one network device over a data communication network, the configuration device comprising a receiving unit having an interface for receiving a configuration request from a network device, wherein the configuration request includes a device identifier identifying the network device; and a configuration unit for providing, in response to the configuration request, configuration data for at least one device component of the network device to the network device. According to a further embodiment, the configuration unit is adapted for providing, in response to the configuration request, configuration data for all device components of the network device to the network device.

Such a configuration device may be used for automatically configuring network devices, wherein the configuration device has stored in a storage thereof at least one device identifier of a network device and the associated configuration data for configuring the network device and in particular its device components.

According to a further embodiment, the configuration data for each device component specify a global network address uniquely identifying the device component in the data communication network. It should be understood, that the data communication network includes the network device and the configuration device.

According to further embodiments of the second aspect, the configuration device is adapted for providing the functionality as disclosed with regard to embodiments of the first aspect and/or for providing the functionality as required by embodiments of the first aspect.

According to a third aspect of the herein disclosed subject-matter, a method of operating a network device is provided, the network device comprising at least two device components including a first device component, the network device further comprising a node device being configured for communicating with an external data communication network and being configured for communicating with the at least two device components via an internal data communication network of the network device, the method comprising: (i) receiving external data from the external data communication network; and (ii) providing to the first device component, in response the external data and via the internal communication network, component specific data related to the first device component.

According to an embodiment, the component-specific data are provided to the first device component by using a fixed internal network address of the first device component, the internal network address identifying the first device component in the internal network. Further, according to a further embodiment, the component-specific data are configured for associating a global network address with the communication interface of the first device component, the global network address allowing addressing of the first device component from the data communication network.

According to further embodiments, the method according to the third aspect is adapted to provide the functionality as disclosed with regard to the first aspect.

According to a fourth aspect of the herein disclosed subject-matter, a method of operating a configuration device for providing configuration data to device components of network devices is provided, the method comprising: receiving a configuration request from a network device, the configuration request including a device identifier identifying the network device; and providing to the network device configuration data for at least one device component of the network device.

According to further embodiments, the method according to the fourth aspect is adapted to provide the functionality as disclosed with regard to the second aspect.

According to a fifth aspect of the herein disclosed subject-matter, a computer program for processing a physical object, namely external data, is provided, the computer program being adapted for, when being executed by a data processor device, controlling the method as set forth in the third aspect or an embodiment thereof.

According to a sixth aspect of the herein disclosed subject-matter, a computer program for processing a physical object, namely a configuration request, is provided, the computer program being adapted for, when being executed by a data processor device, controlling the method as set forth in the third aspect or an embodiment thereof.

As used herein, reference to a computer program is intended to be equivalent to a reference to a program element and/or a computer readable medium containing instructions for controlling a computer system to effect and/or coordinate the performance of the above described method.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

Embodiments of the herein disclosed subject matter may be realized by means of a computer program respectively software. However, embodiments of the herein disclosed subject matter may also be realized by means of one or more specific electronic circuits respectively hardware. Furthermore, embodiments of the herein disclosed subject matter may also be realized in a hybrid form, i.e. in a combination of software modules and hardware modules.

In the above there have been described and in the following there will be described exemplary embodiments of the subject matter disclosed herein with reference to a network device, a configuration device, a method of operating a network device and a method of operating a configuration device. It has to be pointed out that of course any combination of features relating to different aspects of the herein disclosed subject matter is also possible. In particular, some embodiments have been or will be described with reference to apparatus type embodiments whereas other embodiments have been or will be described with reference to method type embodiments. However, a person skilled in the art will gather from the above and the following description that, unless other notified, in addition to any combination of features belonging to one aspect also any combination between features relating to different aspects or embodiments, for example even between features of the apparatus type embodiments and features of the method type embodiments, or any combination between network device embodiments and configuration device embodiments is considered to be disclosed with this application.

The aspects and embodiments defined above and further aspects and embodiments of the present invention are apparent from the examples to be described hereinafter and are explained with reference to the drawings, but to which the invention is not limited.

DETAILED DESCRIPTION

The illustration in the drawings is schematic. It is noted that in different figures, similar or identical elements are provided with the same reference signs or with reference signs which are different from the corresponding reference signs only within an appended character.

Some embodiments of the herein disclosed subject matter relate to IP enabled devices, i.e. network devices that are capable of communicating via the internet protocol (IP).

Methods for configuring network devices that communicate via the internet protocol are known. In the following, a possible implementation of conventional techniques in a wind park is discussed in order to more clearly describe of aspects and embodiments of the herein disclosed subject matter. However, it should be understood that the aspects and embodiments of the herein disclosed subject matter are not limited to wind parks. Rather, these teachings can be applied to any network device that is connectable to a data communication network and comprises at least two device components.

Further, embodiments are configured to overcome a difficult, time consuming and human error prone methodology to assign IP address settings, such as IP address, Subnet mask, Default gateway (GW), required for IP enabled devices to be able to talk IP on a network, to device components in network devices such as wind turbines.

Network Configuration by Using Conventional Techniques

Having now first regard to conventional systems, a technical challenge may be that each network component needs to be manually configured for each individual wind park and individual turbine device which requires special techniques to ensure that the right device has been assigned the right IP address. This is highly dependent on manual interactions.

For establishing a wind park, a physical and logical network, per fiber/or copper network, is required between each individual wind turbine and the specific IP configuration server before IP configurations can be deployed to the wind turbine under consideration. IP configuration is a prerequisite before turbine equipment located within a specific turbine can connect and exchange data with each other. In some embodiments the main interface computer within the turbine, e.g. a turbine interface computer (TIC), does not store any information about current production and faults. Nor does it save any historical data before it has received its initial configuration including IP settings.

In comparison with the herein disclosed subject matter, the turbine interface computer in the turbine may use a step-by-step algorithm to determine the IP address of the configuration server during its initial startup which gets in action right after the turbine has been energized for the first time. However, such a step-by-step approach is time-consuming and takes major share in time required to make the SCADA network functioning. As is known, SCADA stands for supervisory control and data acquisition. It generally refers to industrial control systems: computer systems that monitor and control industrial and/or infrastructure-based/facility-based processes.

According to an embodiment, an computer program, e.g. an algorithm, is implemented on the Turbine Interface Computer (TIC) to ensure that each specific TIC receives its correct IP settings from the IP Configuration Server. In an embodiment, the algorithm is utilizing Layer 3 broadcast frames or any other suitable technique, e.g. a technique disclosed herein, to tell the IP Configuration Server that it is alive, online and would like to receive its configuration. The frame is broadcasted out on its local subnet on a specific UDP port of which the IP Configuration Server is listening. A device identifier, e.g. the turbine's unique serial number (S/N) is included in the broadcast frame. Hence, in this case, the S/N is used as a turbine identifier. The problem is if the network has been segmented in smaller subnets and the TIC and the IP Configuration Server no longer in the same subnet. If this is the case, the IP Configuration Server might never receive the broadcast message sent from the TIC.

By using conventional techniques, when a wind turbine device is being assembled it is important to know to which wind park it will go. However the final position of the wind turbine is not known in the beginning. Therefore it is difficult if not impossible to finalize or modify configurations of the wind turbine before it has been erected and energized on site. Hence, using conventional techniques, the final configuration and/or modification of the wind turbine device would have to be carried out only after the wind turbine device has been erected, either by manual human procedures or automated software procedures.

Hence the configuration of the wind turbine device may involve in particular the following problems:

Problem A

A wind turbine consists of several Ethernet enabled device components. These devices components require IP address settings configured before they can talk IP. IP settings can be set in two ways: Static or dynamically assigned by a DHCP server ("Dynamic Host Configuration Protocol server"). The DHCP server allocates by design IP addresses dynamically meaning that IP addresses being allocated cannot be controlled without time-consuming manual configuration of the DHCP server. By an extension to DHCP, described in RFC3046, it is possible to overcome the limitation of the nature of DHCP. DHCP Option 82 would enable a manufacturer of a wind turbine to assign IP addresses based on which physical port on the Ethernet switch in the wind turbine where the DHCP Discover message was received. This requires a DHCP Option 82 specific configuration in the Ethernet switch of the wind turbine. Without this configuration on the Ethernet switch in the wind turbine the IP address will not be assigned to the end device.

Hence using the DHCP option 82, the IP address allocation procedure using conventional techniques may include the following:

1. Configure the DHCP server with Option 82 reservations based on MAC-identifier from switches. This is done manually and can be very time consuming depending on how many devices that needs IP settings.
2. Prepare configuration files for Ethernet switches containing DHCP Option 82 information and other site specific network configuration settings.
3. Erect the wind turbine and connect fiber strands or copper cables to the Ethernet switch in the wind turbine to assure that network messages can be transmitted outside of the wind turbine.
4. Note and manually type in the MAC-address of the first Ethernet switch (DHCP-Relay node) of the wind turbine in the DHCP Server.
5. Wait for Ethernet devices in the turbine to send DHCP-discover messages.
6. The Ethernet device will receive its IP settings via DHCP server.

Problem B

The first section of the problem is not being solved today. The service running on the TIC responsible for storing the information in databases are not being initialized before the TIC has been identified by the IP Configuration Server and received its final configuration. The services running on the TIC is launched in a systematic chain. If the procedure explained in Problem A is not started successfully, the service explained in Problem B will never be started. The identification service is one of the first services to be started.

The TIC does not trust the integrity of the data before it has been fully configured with all parameters received from the IP Configuration Server.

The algorithm that tries to identify the location of the IP Configuration Server would only work without human interactions if the TIC successfully targets the IP Configuration Server.

A possible automated IP configuration procedure which uses conventional techniques is described below.

The configuration/settings allocation procedure for the TIC may be as follows:

1. The TIC executes its normal DHCP process asking for a dynamic IP address. The assigned IP address could be either i) The one it would receive from the IP configuration server later in the process or ii) a dynamically assigned IP address (temporary IP address) if DHCP Option 82 is not implemented.
2. After the TIC has received a temporary IP address it builds a list of targets and tries to tell the IP configuration server that is it alive. For example, all messages may be sent to UDP port 49000. The following exemplary scenarios are possible:

a) If TIC knows (in normal cases, it does not) WPS server IP Address/IP Configuration server, it sends a message requesting further configuration parameters. Here WPS server stands for Wind Power SCADA (WPS) server. It is a SCADA server specifically developed for use in Wind farms.

b) The TIC does not know the IP address of the IP Configuration Server, but it knows the IP address of the DHCP server. Therefore it sends a Layer 3 IP message to the IP address of which it received its IP address on UDP port 49000. If the DHCP server is not hosting the IP Configuration server it will try a series of logical attempts based on the IP address received from the DHCP Server, for example:

i. x.x.x−1.100
  ii. x.x.x+1.100
  iii. x.x.x−2.100
  iv. x.x.x+2.100
  v. x.x.x.100 c) If any of the above mentioned methods under step b) does not work TIC waits 5 minutes and tries again. It then returns to step a) of this procedure description.

3. After receiving a message request from TIC, the IP Configuration Server looks in its database to find the matching configuration/parameters to the S/N it has received in the message.

4. The IP Configuration Server then sends a list of parameters to the IP address from where it received the initial request.

5. The TIC parses the configuration file and changes its settings accordingly. After all settings have been changed it initiates a reboot, e.g. with 15 seconds delay.

6. After the reboot it starts up with the new configuration settings.

This configuration/settings allocation procedure can only be carried out if all steps of the "IP address allocation" have been executed successfully. If the process fails each TIC (one per wind turbine) will have to be configured manually by uploading a configuration file of XML format that is used to manually classify each turbine device because the TIC cannot associate itself with the IP configuration server automatically.

Network Configuration by Using Techniques Disclosed Herein

In contrast to the above considerations which shall illustrate the possibilities of conventional configuration techniques for network devices such as wind turbine devices, embodiments of the herein disclosed subject matter may include one or more of the following features.

According to an embodiment, assigning or setting up an IP address configuration in a device component of a network device is performed through a controlled interface (e.g. the TIC) of the network device. Using the TIC as an interface to set parameters to device components within the wind turbine devices provides the opportunity to use the functionalities offered by the different layers of the "Open. Systems Interconnection Reference Model" (In short OSI Reference model). By enabling and utilizing higher level of the OSI model makes it possible to use more advanced technology and thereby ensure the integrity of transferred data/parameters to devices components. The term "parameter" as used herein may be, without being limited hereto, any parameter a device within a turbine needs to receive and know of. It should be noted that embodiments of the herein disclosed subject matter are not limited to IP configurations only.

According to an embodiment, there is provided a IP subnet in every turbine that only resides within a specific turbine. For example, by providing a local IP subnet in every turbine that only resides within a specific turbine by means of VLAN configuration makes it further possible to assign two IP addresses to every device component—One "internal" and one "external". The characteristic of the "internal" network is that devices across multiple wind turbines share the same IP configuration but as the "internal" network is only present within a specific turbine no IP address conflicts are seen. The "external" IP address will be valid outside the internal network and may be e.g. "public", globally available and/or routeable.

Providing an internal network in every turbine may have the following advantages:

1. If all device components have two IP addresses—an "internal" and an "external"—it would simplify commissioning of the wind turbine as service technicians would know the IP addresses, as they are always the same in every turbine.

2. It's further possible to configure or monitor individual devices even if they haven't received any "external" IP addresses by means of DHCP as they already have a static "internal" IP address set that can be reached via the "internal" network by the TIC.

Implementation of two IP addresses for a single network interface in each device component may be done by utilizing already known technology like 802.1Q virtual local area network (VLAN) tagging. However any other technique may be used that allows to implement two network addresses on a single network interface, e.g. by assigning to each transmission a tag indicating the logical network to which the transmission shall belong. This technique makes it possible to assign two IP addresses to a single network interface (e.g. a network interface card (NIC)) and keep the traffic separated. This feature allows separation "internal" and "external" network seen from a device point of view.

Figure 1:
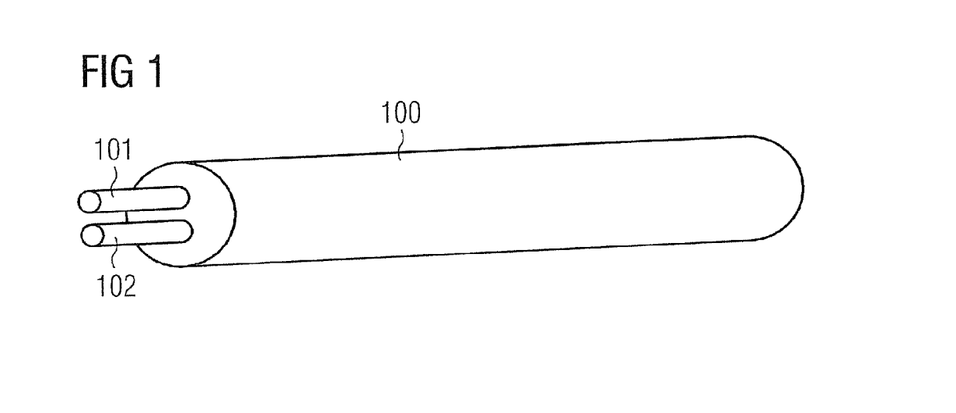
FIG. 1 illustrates the separation of the traffic on a single physical media into logically separated networks in accordance with embodiments of the herein disclosed subject matter.

FIG. 1 illustrates the separation of the traffic on a single physical media 100 into logically separated networks 101, 102, in accordance with embodiments of the herein disclosed subject matter. The physical media 100 may be e.g. a wire, an optical fiber, or any other suitable media for IP traffic. The logically separated networks 101, 102 are herein referred to as internal network 101 and external network 102. The logical separation may be performed by associating a tag with each IP packet transmitted over the physical media 100 wherein the tag indicates to which logical network the IP packet belongs. Other embodiments include other measures for separating traffic and providing an internal network and an external network in the network device. In accordance with embodiments of the herein disclosed subject matter the internal network has a static IP configuration and the external network has a dynamic IP configuration.

Figure 2:
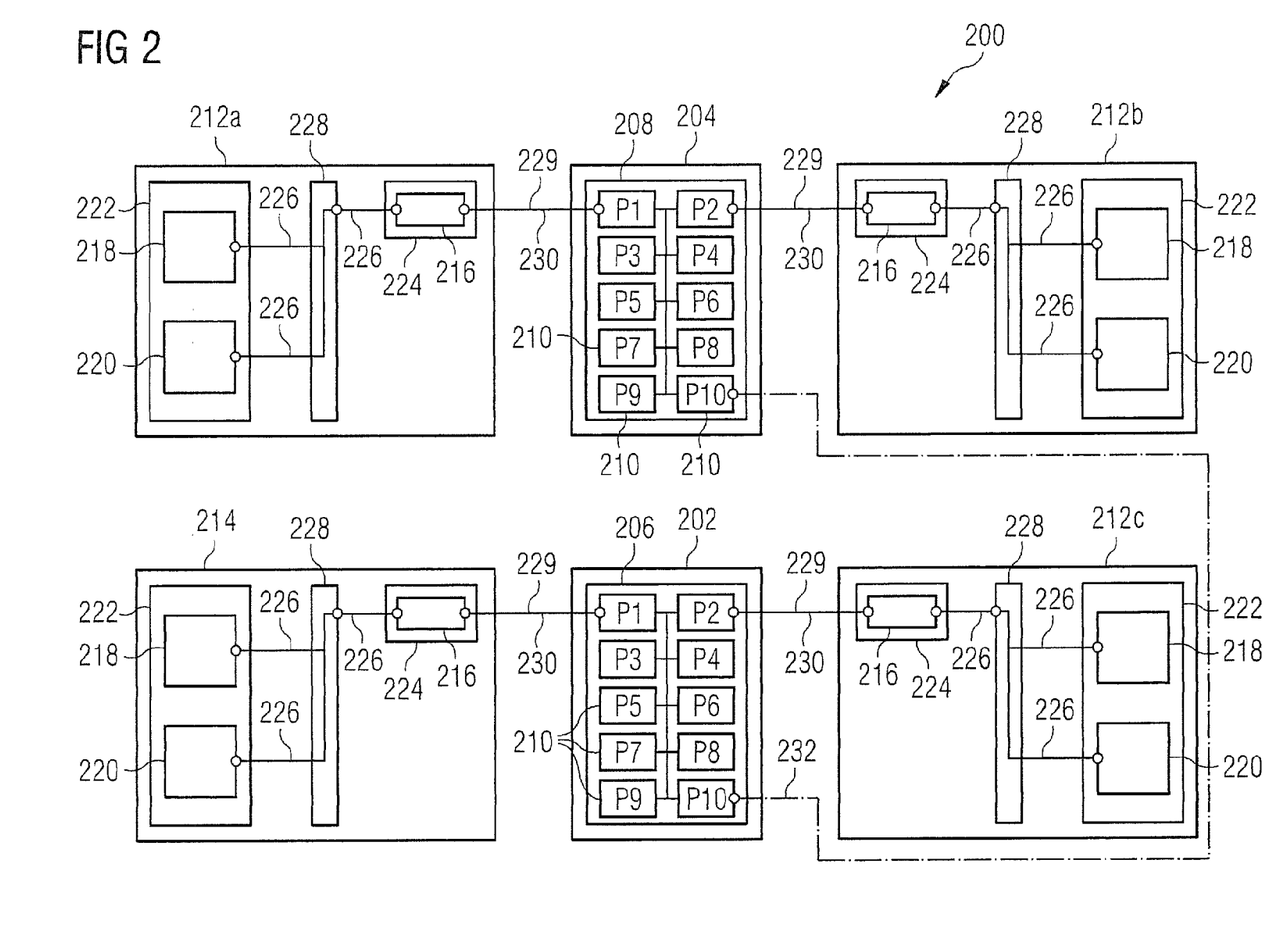
FIG. 2 schematically shows a network device in accordance with embodiments of the herein disclosed subject matter.

FIG. 2 schematically shows a network device 200 in accordance with embodiments of the herein disclosed subject matter. Embodiments of the herein disclosed subject matter allow to maintain an already installed physical network topology and layout of a wind turbine. For example, in an embodiment only one new logical network adapter will be created on the existing turbine equipment and they need to be IEEE 802.1Q aware. A logical adapter tagging, transporting and responsible for the "internal" network in the turbine will be created ("Internal" IP Adapter"). In such a scenario, the factory default setting for all devices includes the following minimum configuration: First, IEEE 802.1Q feature is enabled and, secondly, a static "internal" IP address unique to the internal network is set for each device.

Next, an exemplary implementation of the network device 200 is discussed in more detail.

In an embodiment shown in FIG. 2, the network device 200 is a wind turbine device having a tower and a turbine nacelle (not shown in FIG. 2). The wind turbine device 200 includes a tower switch 202 and a nacelle switch 204. Other embodiments include only a single switch or three or more switches. In accordance with an embodiment, the tower switch 202 and the nacelle switch 204 are inside the wind turbine device. These switches 202, 204 may be Ethernet switches. Each switch includes a core switching platform 206, 208 with a plurality of ports, some of which are indicated at 210 in FIG. 2, e.g. ten ports P1 to P10.

The wind turbine device 200 further comprises plurality of device components 212a, 212b, 212c and a node device 214, e.g. in the form of a turbine interface computer (TIC). According to an embodiment, the turbine interface computer 214 is located inside the tower (not shown in FIG. 2). Further, the device components may be located in the tower and/or the nacelle. For example, in an embodiment two device components 212a, 212b are located inside the nacelle (not shown in FIG. 2) and one device component 212c is located inside the tower. However, any other number of device components and distribution among the nacelle and the tower is also possible.

The device components 212a, 212b, 212c and the node device 214 each comprise a physical network interface 216, sometimes also referred to as network adapter or network interface card (NIC). Further, each physical network interface 216 has associated therewith a first logical network interface 218 and a second logical network interface 220. The logical network interfaces which may include two or more logical network interfaces 218, 220 are commonly referred to as logical adapters 222. The one or more physical network interfaces 216 of a device entity, e.g. of the device component 212a, 212b, 212c or node device 214, are commonly referred to as physical adapters 224. The association of the first logical network interface 218 and the second logical network interface 220 with the respective physical network interface 216 is indicated with connections 226. However, it should be understood that the conntections 226 are not physical connections such as wires or the like but are rather logical connections. The separation between physical device layer and logical device layer is indicated by the bar 228 in FIG. 2.

According to an embodiment, the physical network interface 216 is a network interface card, e.g. a 100 MBit/s full duplex Ethernet adapter.

In an embodiment, the first logical network interface 218 is an internal network interface and the second logical interface 220 is an external network interface.

In a further embodiment, the internal network interface 218 has a static IP configuration. For example, in an embodiment the static IP address of the internal network interface 218 of the first device component 212a is 10.10.10.3, the static IP address of the internal network interface 218 of the second device component 212b is 10.10.10.4 and the static IP address of the internal network interface 218 of the third device component 212c is 10.10.10.2. Further, the static IP address of the internal network interface 218 of the node device 214 is 10.10.10.1 in one embodiment. With such a configuration, the node device 214 can communication with the device components 212a, 212b, 212c irrespective of the settings of the external network interfaces of these components. Hence, the wind turbine device 200 may be pre-configured internally without connecting the wind turbine device to an external data communication network.

For operation in a virtual local area network (VLAN), the internal network interfaces 218 each has associated therewith a VLAN tag indicating that the internal network interface 218 belongs to the group of internal network interfaces. In an exemplary example, the VLAN tag for the internal network interfaces is 999.

In a further embodiment, the external network interface 220 has a dynamic IP configuration.

According to an embodiment, configuration data for dynamically configuring the external network interfaces 220 is received from a DHCP server upon request of the wind turbine device 200. According to an embodiment, such a request includes a device identifier which is recognized by the DHCP server. The DHCP server may be configured for selecting device specific configuration data and providing it to the node device 214 (TIC). The IP configuration of the node device 214 itself may be done via a usual DHCP process well known in the art.

As the internal network addresses are static, the dynamically determined external network addresses, which are associated with the individual external network interfaces 220 by the DHCP server, may include an address portion that depends is similar or identical to a portion of the internal network address.

For example, the DHCP server may be configured for associating with external network interface 220 of a device entity 212a, 212b, 212c, 214 a dynamic IP address part of which corresponds to the respective part of the internal network interface 218 that is associated with the same physical interface 216. The corresponding part of the internal IP address and the external IP address may be for example the last three bits in a binary notation of the IP address or the last decimal number in decimal notation of the IP address. For example, with the internal IP address 10.10.10.1 the external IP address x.y.z.101 may be associated, with the with the internal IP address 10.10.10.2 the external IP address x.y.z.102 may be associated, and so on.

For operation in a virtual local area network (VLAN), the external network interfaces 220 each have associated therewith a VLAN tag indicating that the external network interface 220 belongs to the group of external network interfaces. In an exemplary example, the VLAN tag for the external network interfaces is 100.

The device entities of the wind turbine, i.e. the device components 212a, 212b, 212c and the node device 214 are connected to the switches via any known physical network media, such as the physical network media 100 shown in FIG. 1. The communication link 229 that is established by the switch 202, 204 and the respective physical network interface is a link including internal and external VLANs. Sometimes such a link 229 is referred to as promiscuous link.

According to an embodiment, the physical network media between a switch 202, 204 and a device entity 212a, 212b, 212c, 214 is an electrical network media 230, such as a wire. Further, according an embodiment the physical network media between two switches 202, 204 is an optical network media 232.

Figure 3:
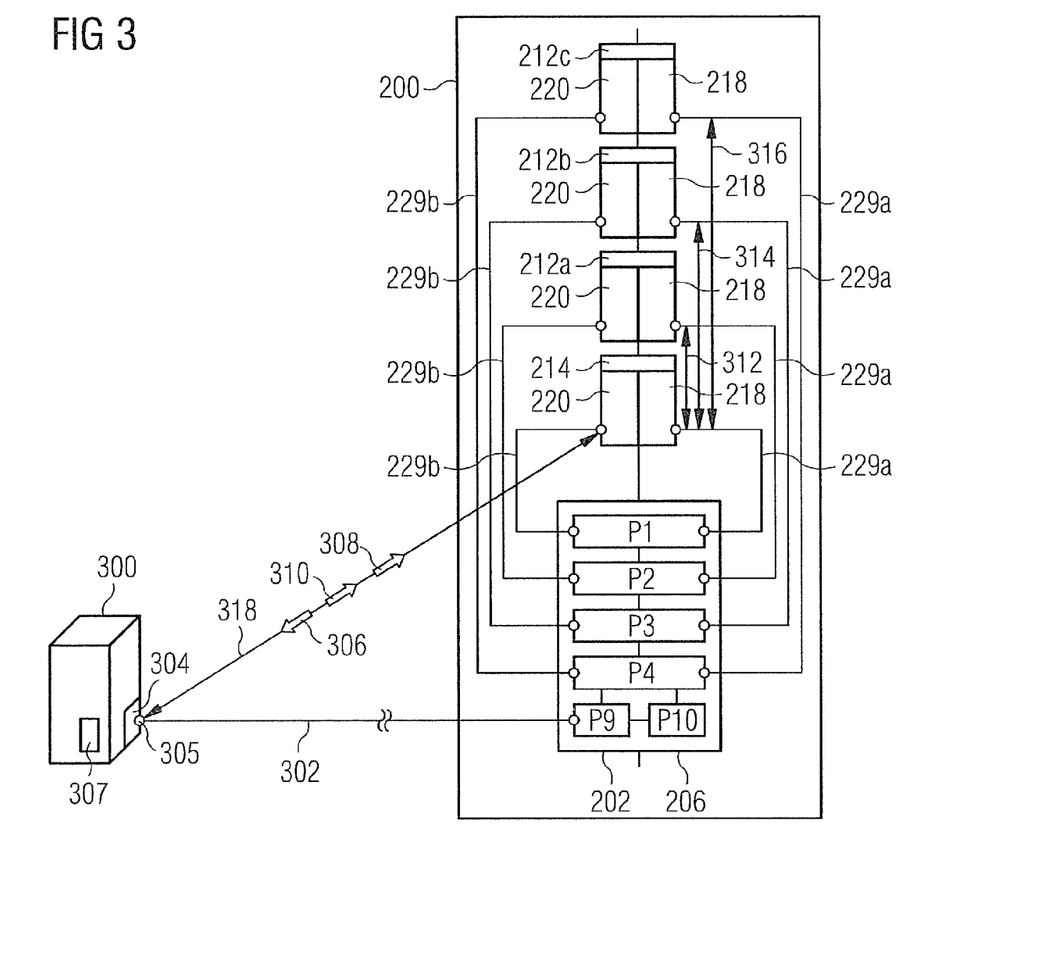
FIG. 3 shows a network device and a configuration device in accordance with embodiments of the herein disclosed subject matter.

FIG. 3 shows a network device 200 and a configuration device 300 in accordance with embodiments of the herein disclosed subject matter.

The network device 200 is a wind turbine device similar to the wind turbine device shown in FIG. 2. Similar or identical elements of the network devices 200 in FIG. 2 and FIG. 3 are associated with the same reference signs and the description thereof is not repeated here.

In contrast to the network device 200 in FIG. 2, the network device 200 in FIG. 3 includes only a single core switching platform 206. Further, the individual internal links 229a and external links 229b between the device entities 212a, 212b, 212c, 214 and the switch 202 are shown in FIG. 3. Herein, the term "internal link" refers to a data communication link via an internal network (e.g. internal VLAN) and the term "external link" refers to a data communication link via an external network (e.g. external VLAN).

In accordance with an embodiment, the configuration device 300 is configured for providing configuration data to device entities 212a, 212b, 212c, 214 of the network device 200 over a data communication network, indicated at 302 in FIG. 3. In accordance with an embodiment, the configuration device 300 comprises a receiving unit 304 having an interface 305 for receiving a configuration request 306 from a network device 200. The configuration request 306 includes a device identifier identifying the network device 200.

The configuration device 300 further comprises a configuration unit 307 for providing, in response to the configuration request 306, configuration data 308 for at least two device components 212a, 212b, 212c of the network device 200 to the network device 200. In FIG. 3, the configuration request 306 and the configuration data 308 are shown as being exchanged between the configuration device 300 and the turbine interface computer 214 of the wind turbine device 200. However, it should be understood that this only illustrates the logical interaction while the physical data path is over the data communication network 302, the switch 202 and the external link 229b between the switch 202 and the turbine interface computer 214.

In accordance with an embodiment, the configuration data 308 for each device unit 212a, 212b, 212c, 214 specify a global network address uniquely identifying the device unit 212a, 212b, 212c, 214 in the data communication network 302 which includes the network device 200 and the configuration device 300.

As mentioned above, each device entity 212a, 212b, 212c, 214 will have access to an "Internal" and "External" network. The TCP/IP routing table on each device entity will determine whether to use the "Internal" or "External" virtual adapter when there is a need to communicate with other devices. If the "Internal" network is chosen by the TCP/IP routing table it will only be able to talk to components within the wind turbine where it is by itself. According to an embodiment, this is controlled by access-control-lists and VLAN trunk/promiscuous ports on the Ethernet switches within the turbine.

With regard to problem B) described above, according to an embodiment a helper agent for enhancing the functionality of the TIC IP initialization process is provided.

In an embodiment, two variants of a new "helper" agent are used. One for the TIC (Turbine Interface Computer) and one for the server on which the DHCP Server is hosted.

The purpose of this agent for the server where the DHCP service is hosted is to act as an "helper" in case the DHCP service is not hosted on the same server as the IP Configuration Server by responding to the TIC where it can find the IP configuration server if it's being asked. This can be done by using any suitable procedure, e.g. even by using conventional technology. For example, responding to the TIC where it can find the IP configuration server may be performed as described in the above section "NETWORK CONFIGURATION BY USING CONVENTIONAL TECHNIQUES".

The purpose of this agent for the TIC is to enable the TIC to receive information of where to find the IP Configuration Server via a customizable option in DHCP and thereby ensure that it will always be able to find the IP Configuration Server and get its final configuration in one go.

In accordance with an embodiment, both implementations are made to ensure support for legacy TIC's software and/or even older systems.

According to an embodiment, the configuration device 300 (e.g. the configuration unit 307) is configured for providing, in response to the configuration request 306 configuration data 310 for configuring the TIC 214. Such configuration data 310 may include an external network address of the external network interface 220. Further, in case the configuration data 310 for the TIC 214 and the configuration data 308 for device components are not provided by the same configuration device, the configuration device which is adapted for configuring the TIC may be further adapted for indicating to the TIC the address of a further configuration device (not shown) that is adpated for providing configuration data for the device components. Alternatively, in another embodiment, the configuration device which is adapted for configuring the TIC may send a configuration request to the further configuration device, requesting the sending of the configuration data 308 for the device components to the TIC 214. In still other embodiments, the configuration device 300 is adapted for providing the configuration data for the TIC 214 and, subsequently, the configuration data for the device components to the TIC 214. According to an embodiment, both configuration data are provided to the TIC in response to a single configuration request 306.

After the TIC 214 has received its IP configuration data 310 from the IP configuration server 300, it acts to configure the other devices within the same turbine on the internal network. Hence, in accordance with this functionality, the node device (TIC 214) may be referred to as a proxy server.

FIG. 3 further represents the overall auto-configuration process through proxy node 214. The proxy node (node device) here is the TIC (Turbine Interface Computer). After the node device has been configured (e.g. by IP address allocation procedure such as conventional DHCP procedure), it will receive configuration parameters for all other internal turbine device components. As the TIC/Proxy-node 214 already knows where to find these device components 212a, 212b, 212c (because of the "Internal" turbine network) it can be used to connect and configure the global IP address of the devices components.

An exemplary configuration procedure comprises the following features:

1) The TIC 214 has to find the IP configuration server identifying itself with its turbine serial number (S/N), e.g. by broadcasting the configuration request 306. This may be done according to the extension "helper" agent described above. The serial number number is unique for the wind turbine device. According to an embodiment this first action of the TIC is done via the external interface.

2) After the TIC (e.g. its external network address) has been configured (e.g. by configuration data 310) it will receive, on its external interface 220, the configuration for the other internal device components 212a, 212b, 212c, indicated at 308 in FIG. 3.

3) Use the internal network to connect to a first device component 212a and configure its External IP address settings through whatever supported protocol for that device by providing component specific data 312, being adapted for configuring the first device component 212a, to the first device component 212a.

4) & 5): Repeat "step 3" for all remaining device components 212b, 212c in a particular turbine 200, by providing component specific data 314, 316 to the remaining device components 212b, 212c.

Any communication between the configuration device 300 and the network device 200, as described in accordance with embodiments of the herein disclosed subject matter, is generally indicated at 318 in FIG. 3.

It should be noted that a reference to a device entity is considered as disclosing a reference to a device component and as disclosing a reference to a node device. Reference to at least two device entities is considered as disclosing reference to at least two device components and as disclosing reference to a node device and at least one device component.

Further, while in some exemplary embodiments reference is made to the internet protocol version 4 (IPV4, it should be understood that this is only exemplary and that in other embodiments the protocol may be the internet protocol version 6 (IPV6) or any other suitable protocol.

According to embodiments of the invention, any suitable entity disclosed herein, e.g. the logical interfaces, etc, are at least in part provided in the form of respective computer programs which enable a processor device to provide the functionality of the respective entities as disclosed herein. According to other embodiments, any suitable entity disclosed herein may be provided in hardware. According to other—hybrid—embodiments, some entities may be provided in software while other entities are provided in hardware.

It should be noted that any entity disclosed herein (e.g. device components, units and devices) are not limited to a dedicated entity as described in some embodiments. Rather, the herein disclosed subject matter may be implemented in various ways and with various granularity on device level or software module level while still providing the desired functionality. Further, it should be noted that according to embodiments a separate entity (e.g. a software module, a hardware module or a hybrid module) may be provided for each of the functions disclosed herein. According to other embodiments, an entity (e.g. a software module, a hardware module or a hybrid module (combined software/hardware module)) is configured for providing two or more functions as disclosed herein. According to respective embodiments, any device disclosed herein, e.g. the node device or the configuration device, may comprise a processor device including at least one processor for carrying out at least one computer program corresponding to a respective software module.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

In order to recapitulate the above described embodiments one can state:

1) There is provided an agent for listening in broadcast address on (redundant) DHCP server.

2) There is provided a procedure for automating the sending of IP addresses and configurable variables (IP address, Subnet, Gateway) for each of the device components utilizing an internal network in each turbine device.

3) There is provided configuring each of the device components through a misted and secure network proxy node (e.g. a turbine interface computer, TIC).

Aspects, embodiments and examples of the herein disclosed subject matter may provide the following advantages:

a) Ease in IP address configuration as no manual intervention is needed b) No need for a central DHCP Server with option 82 functionality (which leads to manual configurations in DHCP server)

1. Maintains integrity of data from turbine devices as they will not depend on DHCP anymore.

2. Avoid too many human error prone DHCP configurations

3. Trusted configuration method based on turbine S/N rather than lower level OSI protocols.

c) Time-consuming manual procedures have been eliminated to reduce the time required to bring SCADA system running and operational.

d) A secure process using the Proxy Node (Trusted device) as entry point to configure other devices.

e) The proxy device can easily flag an alarm if it cannot access a device, it cannot see it's alive, or it cannot reconfigure (time interval to assure that all components have IP addresses in case of replacement)

f) TIC can log data from the beginning without central SCADA present because it can use the internal IP addresses. This can be done in a secure way as the TIC is able to detect IP address conflicts (if the Ethernet switch has been replaced/is faulty/or otherwise enables two turbines internal network to be shared.

Finally, there is provided a network device which is connectable to a data communication network. The network device comprises at least two device components including a first device component. Each device component has a communication interface for communicating data. The communication interface is accessible by using an internal, static network address associated with the communication interface. The network device further comprises a node device having an internal interface for communication with the communication interface of each of the at least two components and an external interface for communication with an external device different from the network device. The node device is configured for receiving external data from the data communication network and providing to the first device component, in response the external data and by using the internal network address of the first device component, component specific data related to the first device component.

The invention claimed is:

1. An apparatus comprising:
    a wind turbine being connectable to a data communication network, wherein the wind turbine includes therein:
        at least two device components including a first device component and a second device component, each device component including a communication interface that enables communicating data, the communication interface being accessible by using an internal network address associated with the communication interface; and
        a node device including an internal interface that enables communication with the communication interface of each of the at least two device components and an external interface that enables communication with an external device different from the wind turbine,
    wherein the node device is configured to receive external data from the external device via the data communication network, wherein the external data being network configuration data,
    wherein the node device is further configured to provide to the first device component, via the internal network address of the first device component, first component specific data related to the first device component in response to the received external data, wherein the first component specific data being adapted for configuring network settings of the first device component including a first global network address, wherein the first device component responsive to the provided component specific data is configured to associate the first global network address with the communication interface of the first device component, the first global network address allowing addressing of the first device component from the data communication network with communications from outside the wind turbine, and wherein the node device is further configured to provide to the second device component, via the internal network address of the second device component, second component specific data related to the second device component in response to the received external data, wherein the second component specific data being adapted for configuring network settings of the second device component including a second global network address that is different than the first global network address, wherein the second device component responsive to the provided component specific data is configured to associate the second global network address with the communication interface of the second device component, the second global network address allowing addressing of the second device component from the data communication network with communications from outside the wind turbine.

2. The apparatus according to claim 1, wherein the communication interface of each device component includes at least two logical interfaces of which a first logical interface is associated with the internal network address and a second logical interface is associated with the global network address.

3. The apparatus according to claim 1, wherein the internal network address of the at least one device component is a fixed network address.

4. The apparatus according to claim 1, wherein the node device is configured to broadcast a configuration request to the data communication network, the configuration request including a device identifier identifying the wind turbine.

5. The apparatus according to claim 4, further comprising:
the external device configured to communicate with the wind turbine using the data communication network, wherein the external device is configured to:
receive the configuration request from the node device of the wind turbine, the configuration request including the device identifier identifying the wind turbine; and
provide in response to the configuration request, respective network configuration data for the at least two device components included in the wind turbine to the wind turbine,
wherein the network configuration data for each of the at least two device components specifies the respective first and second global network addresses uniquely identifying each of the respective first and second device components in the data communication network which includes the wind turbine and the external device.

6. A method of operating the apparatus according to claim 1, the method comprising:
receiving with the node device included in the wind turbine, the external data from the external device via the data communication network;
the node device providing to the first device component, in response to the external data and via the internal communication network, the first component specific data related to the first device component;
the first device component in response to the provided first component specific data, associating the first global network address with the communication interface of the first device component;
receiving with the first device component, communications from the data communication network addressed to the first global network address;
the node device providing to the second device component, in response to the external data and via the internal communication network, the second component specific data related to the second device component;
the second device component in response to the provided second component specific data, associating the second global network address with the communication interface of the second device component; and
receiving with the second device component, communications from the data communication network addressed to the second global network address.

7. The method according to claim 6, wherein the first component specific data are provided to the first device component by using a fixed internal network address of the first device component, the fixed internal network address identifying the first device component in the internal network.

8. The method according to claim 6, comprising:
receiving with the external device at least one configuration request from the wind turbine, the configuration request including a device identifier identifying the wind turbine;
responsive to the configuration request, the external device providing to the wind turbine, the network configuration data for the at least two device components of the wind turbine based on the device identifier identifying the wind turbine, the network configuration data including the respective first and second global network addresses respectively uniquely identifying the respective first and second device components in the data communication network which includes the wind turbine and the configuration device.

* * * * *